United States Patent
Lee et al.

(10) Patent No.: US 10,229,071 B2
(45) Date of Patent: *Mar. 12, 2019

(54) METHOD AND APPARATUS FOR DIRECTLY CONNECTING DOCKEE DEVICE TO PERIPHERAL DEVICE IN A WIRELESS DOCKING NETWORK

(71) Applicant: Samsung Electronics Co., Ltd., Gyeonggi-do (KR)

(72) Inventors: Jong-Hyo Lee, Gyeonggi-do (KR); Karthik Srinivasa Gopalan, Bangalore (IN); Kiran Bharadwaj Vedula, Bangalore (IN); Jun-Hyung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,056

(22) Filed: Jan. 12, 2018

(65) Prior Publication Data

US 2018/0137065 A1    May 17, 2018

Related U.S. Application Data

(63) Continuation of application No. 14/286,411, filed on May 23, 2014, now Pat. No. 9,898,422.

(Continued)

(51) Int. Cl.
  *G06F 13/14* (2006.01)
  *H04W 76/14* (2018.01)
  (Continued)

(52) U.S. Cl.
  CPC .......... *G06F 13/14* (2013.01); *G06F 1/1632* (2013.01); *H04W 12/08* (2013.01); *H04W 76/12* (2018.02);
  (Continued)

(58) Field of Classification Search
  CPC ...... G06F 1/1632; G06F 13/14; H04W 4/008; H04W 12/04; H04W 76/023;
  (Continued)

(56) References Cited

U.S. PATENT DOCUMENTS 6,401,124 B1    6/2002  Yang et al.
9,898,422 B2 *  2/2018  Lee ...................... H04W 76/14
(Continued)

FOREIGN PATENT DOCUMENTS

CN    101300809    11/2008
CN    102931944    2/2013
WO    WO 2013/038359    3/2013

OTHER PUBLICATIONS

European Search Report dated Oct. 22, 2014 issued in counterpart application No. 14169624.5-1870.

(Continued)

*Primary Examiner* — Thomas J Cleary
(74) *Attorney, Agent, or Firm* — The Farrell Law Firm, P.C.

(57) ABSTRACT

Disclosed is a method by a docking center of assisting communication between a dockee and a peripheral device to which the docking center is connected, including transmitting, as a group owner of a first group, to the dockee, information for a direct connection between the dockee and the peripheral device, receiving an assist request for setting the direct connection based on the information, transmitting a response indicating whether the assist request is accepted, receiving a release request for releasing a connections between the dockee and the docking center and between the docking center and the peripheral device, terminating control of the peripheral device, receiving a joining request for requesting to join a second group, transmitting a response for joining the second group as a client, the dockee being set (Continued)

as a second group owner, and operating as the group owner of the first group and the client of the second group.

18 Claims, 10 Drawing Sheets

Related U.S. Application Data

(60) Provisional application No. 61/878,410, filed on Sep. 16, 2013, provisional application No. 61/838,648, filed on Jun. 24, 2013, provisional application No. 61/826,703, filed on May 23, 2013.

(51) Int. Cl.
| | |
|---|---|
| *G06F 1/16* | (2006.01) |
| *H04W 12/08* | (2009.01) |
| *H04W 76/12* | (2018.01) |
| *H04W 4/08* | (2009.01) |
| *H04W 4/60* | (2018.01) |
| *H04W 4/80* | (2018.01) |
| *H04L 29/06* | (2006.01) |
| *H04L 29/08* | (2006.01) |
| *H04W 12/04* | (2009.01) |
| *H04W 84/18* | (2009.01) |

(52) U.S. Cl.
CPC ........... *H04W 76/14* (2018.02); *H04L 63/068* (2013.01); *H04L 63/104* (2013.01); *H04L 67/1044* (2013.01); *H04W 4/08* (2013.01); *H04W 4/60* (2018.02); *H04W 4/80* (2018.02); *H04W 12/04* (2013.01); *H04W 84/18* (2013.01)

(58) Field of Classification Search
CPC ............. H04W 76/025; H04W 76/028; H04W 76/043; H04W 76/066; H04W 84/18; H04W 92/10; H04W 76/12; H04W 76/14; H04W 12/08; H04W 4/60; H04W 4/80; H04W 4/08; H04L 67/1044; H04L 67/1046; H04L 67/1063; H04L 63/104; H04L 63/068

See application file for complete search history.

(56) References Cited

U.S. PATENT DOCUMENTS

| | | |
|---|---|---|
| 2007/0097934 A1 | 5/2007 | Walker et al. |
| 2011/0034127 A1 | 2/2011 | Wentink |
| 2012/0099566 A1 | 4/2012 | Laine et al. |
| 2012/0120892 A1 | 5/2012 | Freda |
| 2012/0204233 A1 | 8/2012 | Rubio |
| 2012/0250576 A1 | 10/2012 | Rajamani et al. |
| 2012/0265913 A1 | 10/2012 | Suumaki et al. |
| 2012/0297229 A1 | 11/2012 | Desai et al. |
| 2013/0038359 A1 | 2/2013 | Zhang |
| 2013/0145050 A1 | 6/2013 | Huang et al. |
| 2013/0311694 A1 | 11/2013 | Bhamidipati et al. |
| 2013/0344812 A1 | 12/2013 | Dees et al. |
| 2014/0146745 A1 | 5/2014 | Huang et al. |
| 2014/0196112 A1 | 7/2014 | Huang et al. |
| 2014/0201415 A1 | 7/2014 | Huang et al. |
| 2014/0351602 A1 | 11/2014 | Lee |
| 2015/0056920 A1 | 2/2015 | Huttunen |

OTHER PUBLICATIONS

Wi-Fi Peer-to-Peer (P2P) Technical Specification, Version 1.2, WiFi Alliance Technical Committee P2P Task Group, XP008165048, Dec. 14, 2011.
European Search Report dated Apr. 2, 2015 issued in counterpart application No. 14169624.5-1870.
European Search Report dated Nov. 29, 2016 issued in counterpart application No. 14169624.5-1870, 7 pages.
Chinese Office Action dated Oct. 26, 2017 issued in counterpart application No. 201480029660.0, 30 pages.

* cited by examiner

METHOD AND APPARATUS FOR DIRECTLY CONNECTING DOCKEE DEVICE TO PERIPHERAL DEVICE IN A WIRELESS DOCKING NETWORK

PRIORITY

This application is a continuation application of U.S. patent application Ser. No. 14/286,411, filed on May 23, 2014, which claims priority under 35 U.S.C. § 119(a) to U.S. Provisional Application Ser. Nos. 61/826,703, 61/838,648, and 61/878,410, which were filed in the U.S. Patent and Trademark Office on May 23, 2013, Jun. 24, 2013, and Sep. 16, 2013, respectively, the contents of each of which are incorporated herein by reference.

BACKGROUND

1. Field of the Invention

The present disclosure generally relates to a method and an apparatus for setting and releasing a direct connection between a dockee device and a peripheral device in a wireless docking network.

2. Description of the Related Art

Generally, a docking environment may provide a connection of a laptop, which is an example of a dockee device, with an external peripheral device in order to improve a user experience. Such a docking environment is mainly constituted in an office in which the dockee is docked with a docking center. Here, the external peripheral device includes, for example, a mouse, a keyboard, a printer, a display, and the like.

Further, the docking center may provide additional ports such as a universal serial bus. With the appearance of WiMedia, Wireless-Fidelity (hereinafter, referred to as Wi-Fi), and the like as a high rate home networking technology, the dockee and the docking center wirelessly communicate with each other, thereby achieving a wireless docking.

A Wi-Fi docking mechanism supports a docking of the dockee with various wireless and wired peripheral devices. Such a Wi-Fi docking mechanism may be operated through a Wi-Fi direct peer to peer (P2P) protocol which supports direct communication between Wi-Fi based devices, and it may be operated in an infra mode. Further, architecture of the Wi-Fi docking includes a wireless dockee (WD), a wireless docking center (WDC), and peripheral devices. The wireless dockee consumes a service, and the wireless docking center plays the role of a dock of the peripheral devices and allows the peripheral devices to dock therewith. In this event, the peripheral devices provide a specific service to a corresponding dockee. In the docking environment, all peripheral devices are grouped into a wireless docking network (WDN). A plurality of wireless docking networks (WDN) may belong to one Wi-Fi direct P2P group. Each Wi-Fi direct P2P group includes an access point (AP), a similar group owner (GO), and group client (GC) devices similar to a station device in the infra mode. Here, the group owner may be mapped on a channel supporting a specific service and found by the client devices. The client devices discovering the group owner initialize a group joining procedure to belong to a group of the group owner. As a part of the group joining procedure, the group owner initializes "authorization setting step" in which a security key is provided to the client devices that intend to belong to the group of the group owner. Here, the security keys are used to protect communication in the group. In the case of the Wi-Fi direct P2P connection, use of a personal mode of Wi-Fi protected access (WPA) 2 is permitted in order to achieve a communication security between the devices included in a corresponding P2P group. The WPA 2 supports a pairwise transient key (PTK) for use in a transfer of unicast specified to pairs of group owner/AP and P2P client/client station and a group transient key (GTK) for use in multicast and broadcast communication in a P2P group.

A Wi-Fi based display defines a mechanism for mirroring between a source device and a sink device. Here, when reproduced contents are captured, the source device encodes and packets the captured contents, and then it transfers the content packets to the sink device in a streaming manner. The sink device reversely packets and decodes the packet contents, and it then displays the contents on the sink device or a display unit connected to the sink device. Before performing the above mentioned operation, the source device and the sink device discover each other and communicate with each other through the Wi-Fi direct P2P to identify an accommodation amount through negotiation of the accommodation amount with each other.

A Wi-Fi docking protocol introduced in such a wireless docking environment is an intermediate hop in a topology, and it supports two hop protocols between the dockee and the peripheral device along with the wireless docking center so as to operate the Wi-Fi direct P2P. In addition, a Miracast is defined by a Wi-Fi alliance as a protocol for supporting a case of using a Wi-Fi display and a mirroring in the docking environment. Such a Miracast is a single hop protocol having a terminal entity at an end of a connection, i.e., a Miracast sink. Accordingly, it is required to operate the Miracast which is a single hop protocol through a Wi-Fi docking protocol constituted of two hop protocols in the wireless docking environment.

SUMMARY

The present disclosure has been developed to address the above-mentioned problems in the conventional art, and to provide at least the advantages described below. Accordingly, an aspect of the present disclosure is to provide a method and an apparatus for directly connecting a dockee with a Miracast based on peripheral device without passing through a wireless docking center.

In accordance with an aspect of the present disclosure, there is provided a method of assisting communication between a dockee and a peripheral device by a docking center in a wireless docking network, including transmitting, by the docking center which is a group owner of a first group, to the dockee, information for a direct connection between the dockee and the peripheral device, wherein the docking center is connected to the peripheral device, receiving, from the dockee, an assist request for setting the direct connection based on the information, transmitting, to the dockee, a response indicating whether the assist request is accepted, receiving, from the dockee, a release request for releasing a connection between the dockee and the docking center and the connection between the docking center and the peripheral device, terminating control of the peripheral device, receiving, from the dockee, a joining request for requesting to join a second group, transmitting, to the dockee, a response for joining the second group as a client, wherein the dockee is set as an owner in the second group, and operating as the group owner of the first group and the client of the second group.

In accordance with another aspect of the present disclosure, there is provided a method of setting, by a dockee, a direct connection between the dockee and a peripheral device in a wireless docking network, including docking to a docking center which is a group owner of a first group, transmitting, if information for a direct connection between the dockee and the peripheral device is received, an assist request for setting the direct connection based on the information, to the docking center, receiving a response indicating whether the assist request is accepted from the docking center, transmitting, a release request for releasing a connection between the dockee and the docking center and a connection between the docking center and the peripheral device, to the docking center, receiving a response to the release request from the docking center, transmitting a joining request to the docking center for requesting to join a second group, and receiving a response from the docking center for joining the second group as a client, wherein the dockee is set as an owner in the second group.

In accordance with another aspect of the present disclosure, there is provided a docking center for assisting communication between a dockee and a peripheral device in a wireless docking network, including a transceiver configured to transmit, to the dockee, information for a direct connection between the dockee and the peripheral device, wherein the docking center is connected to the peripheral device and a group owner of a first group, receive, from the dockee, an assist request for setting the direct connection based on the information, transmit, to the dockee, a response indicating whether the assist request is accepted, receive, from the dockee, a release request for releasing a connection between the dockee and the docking center and a connection between the docking center and the peripheral device, receive, from the dockee, a joining request for requesting to join a second group, and transmit, to the dockee, a response for joining the second group as a client, wherein the dockee is set as an owner in the second group, and a controller configured to terminate control of the peripheral device, and operate as the group owner of the first group and the client of the second group.

In accordance with another aspect of the present disclosure, there is provided a dockee for setting a direct connection between the dockee and a peripheral device in a wireless docking network, including a controller configured to dock to a docking center which is a group owner of a first group, and a transceiver configured to transmit an assist request for setting a direct connection between the dockee and the peripheral device based on information for the direct connection, to the docking center, if the information for the direct connection is received, receive a response indicating whether the assist request is accepted from the docking center, transmit a release request for releasing a connection between the dockee and the docking center and a connection between the docking center and the peripheral device, to the docking center, receive a response to the release request from the docking center, transmit a joining request to the docking center for requesting to join a second group, and receive a response from the docking center for joining the second group as a client, wherein the dockee is set as an owner in the second group.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT INVENTION

Figure 1:
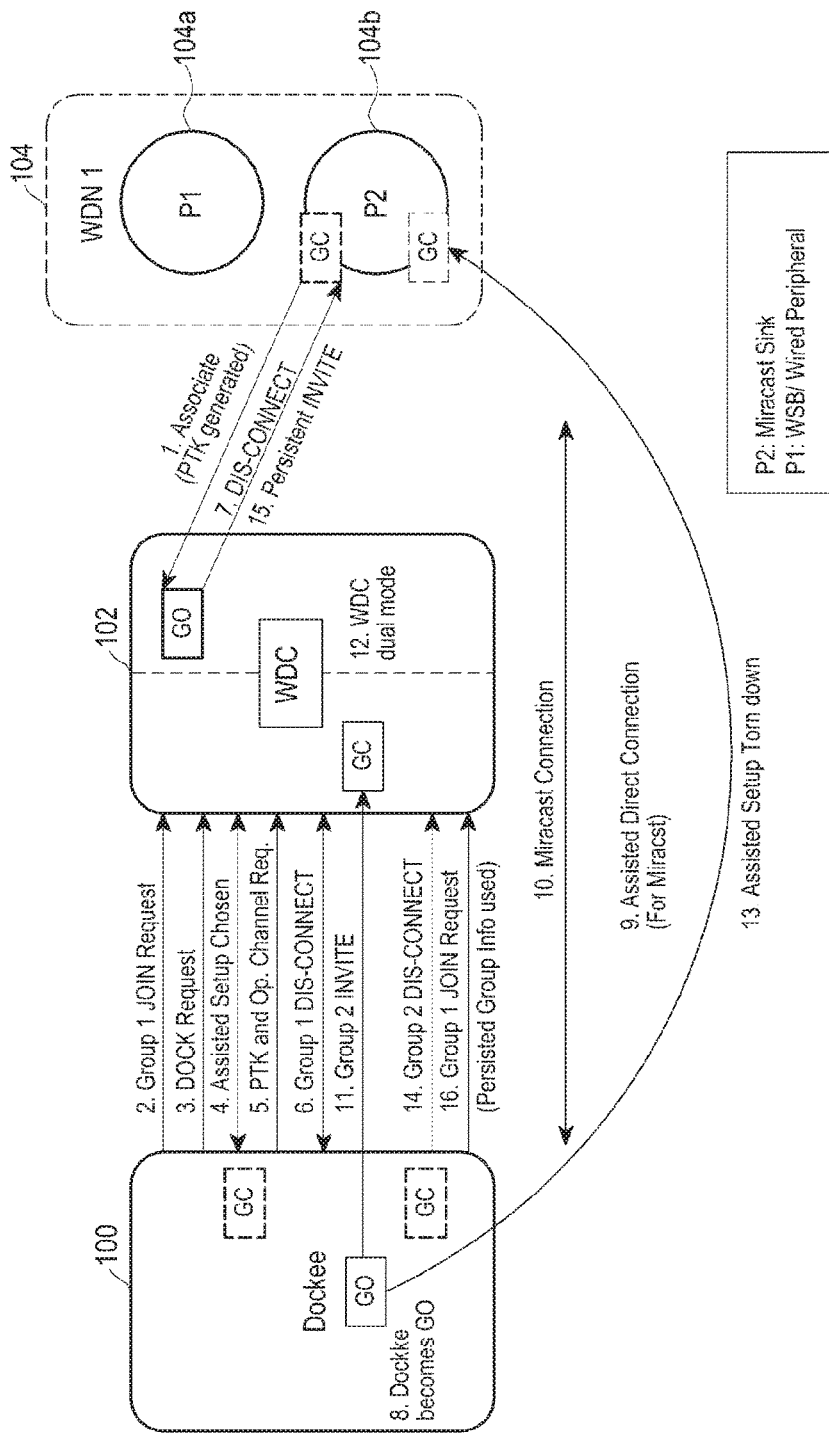
FIG. 1 illustrates an overall operation for directly connecting a dockee with a peripheral device according to an embodiment of the present disclosure.

Hereinafter, operation principles of embodiments of the present disclosure are described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which specific embodiments will now be described in detail with reference to the accompanying drawings. However, it should be understood that the present disclosure is not limited to the specific embodiments, but the present disclosure includes all modifications, equivalents, and alternatives within the spirit and the scope of the present disclosure.

Although the terms including an ordinal number such as first, second, etc. can be used for describing various elements, the structural elements are not restricted by the terms. The terms are only used to distinguish one element from another element. For example, without departing from the scope of the present disclosure, a first structural element may be referred to as a second structural element. Similarly, the second structural element also may be referred to as the first structural element. As used herein, the term "and/or" includes any and all combinations of one or more associated items.

The terms used herein are merely used to describe specific embodiments, and are not intended to limit the present disclosure. Singular forms are intended to include plural forms unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

In the embodiment of the present disclosure, a scheme of supporting a direct connection of a dockee with a peripheral device is provided. In the embodiment of the present disclosure, wireless dockees based on a Miracast, which is a hop protocol, will be described as an example of the peripheral device.

FIG. 1 is a view illustrating overall operation for directly connecting a dockee with a peripheral device according to an embodiment of the present disclosure.

Referring to FIG. 1, a wireless docking environment to which the embodiment of the present disclosure includes a dockee 100, a wireless docking center (WDC) 102, and a wireless docking network (WDN) 104, for example, a WDN 1, in which the peripheral devices are grouped.

According to the embodiment of the present disclosure, the dockee 100 is docked with the WDC 102, and operates as a source device. Further, the dockee 100 is directly connected with at least one peripheral device included in the WDN 1 104 according to the embodiment of the present disclosure, and it may operate as a group owner of a group constituted of the peripheral devices for the direct connection. The dockee 100 may be, for example, a laptop computer, a smart phone, a smart pad, a tablet, or the like.

According to the embodiment of the present disclosure, the WDC 102 supports a direct connection of the dockee 100 with at least one peripheral device included in the WDN 1 104. Meanwhile, when a setting of a direct connection between the dockee 100 and the peripheral device is completed according to the embodiment of the present disclosure, other peripheral devices that are connected to the dockee 100 through the WDC 102 may be present. Therefore, the WDC 102 according to the embodiment of the present disclosure may operate in dual modes that include a mode for supporting a general wireless docking and a mode for supporting the direct connection. Thus, the WDC 102 according to the embodiment of the present disclosure may operate as a GO and a GC with respect to a corresponding group. If the WDC 102 operates as the GO, it performs authorization for protecting communication between peripheral devices in the corresponding group.

According to the embodiment of the present disclosure, it is assumed that the WDN 1 104 includes a device P1 104*a* using a Wi-Fi serial bus (WSB) protocol, and a device P2 104*b* providing a Miracast sink. Here, the devices P1 104*a* and P2 104*b* may include, for example, a mouse, a keyboard, a printer, a display, and the like.

According to the embodiment of the present disclosure, it is assumed that the dockee 100 is directly connected to the device P2 104*b*. The dockee 100, the WDC 102, and the WDN 1 104 may operate as follows:

First step: it is assumed that in Associated (PTK generated), the WDC 102 operates as the GO with relation to a group, e.g., G1, of the peripheral devices included in the WDN1 104. Thus, assuming that the device P2 104*b* is included in the G1, the device P2 104*b* is connected to the WDC 102. In a part of a connection procedure, the WDC 102 performs authorization for protecting communication of the device P2 104*b* included in the G1. The device P2 104*b* acquires transient keys allocated to the G1 from the WDC 102 through the authorization. The transient keys include a PTK, a GTK, a wireless dockee network (WDN) transient key (WTK), and the like.

Second step: it is assumed that the dockee 100 discovers the G1 providing a specific service that the dockee 100 intends to use in Group 1 JOIN Request. In this event, the dockee 100 transfers a request for joining in a group G1 to the WDC 102 which is the GO of the group G1. Through the procedure of joining in the group G1, the dockee 100 acquires the transient keys for protecting communication in the group G1 from the WDC 102 operating as the GO of the group G1 after performing an authorization stage.

Third step: in the DOCK request, the dockee 100 transfers a request for docking with the WDC 102 to the WDC 102 in order to create a wireless connection with one of the devices included in the group G1. Although it is not shown in the drawings, therefore, the WDC 102 notifies the dockee 100 of a completion of a docking setting after setting the docking with the dockee 100.

Fourth step: as the dockee 100 receives a notification of the completion of setting the docking with the WDC 102 in the Assisted Setup Chosen process, the WDC 102 performs operations of supporting the direct connection between the dockee 100 and the peripheral devices. The setting of supporting the direct connection between the WDC 102 and the dockee 100 according to the embodiment of the present disclosure may be supported as the dockee 100 selects the setting or requests the WDC 102 of the setting, or as the WDC 102 determines the setting. As a particular embodiment, the dockee 100 may transmit a universal plug and play (UPnP) action message, in which an action name is set to "AssistedSetupStart", to the WDC 102, thereby initializing a setting of supporting the direct connection. In this event, the UPnP action message may further include a 'DockingSeessionId' for identifying a docking session, a 'PfId' for identifying a peripheral device, an 'ActionType' set to "assistedSetupStart", an 'assistedSetupMode' set to a mode selected by the dockee, and the like. Then, when the WDC 102 accepts the setting of supporting the direct connection, the WDC 102 may transmit a UPnP action response, which has an actionNameResponse set to "assistedSetup", to the dockee 100.

The setting of supporting the direct connection requires a creation of a new group (referred to as a group G2) constituted of the peripheral devices to which the dockee 100 may be directly connected. In this event, the dockee 100 operates as the GO of the group G2.

Fifth step: in the PTK and Op Channel Req, the dockee 100 according to the embodiment of the present disclosure may transfer a request of acquiring group information that is necessary for setting the direct connection, to the WDC 102. The direct connection information may include an Internet Protocol (IP) address or a media access control (MAC) address of each of the peripheral devices in every group managed by the WDC 102 and the transient keys set through the authorization. Further, in the process of acquiring the group information, a pilot protocol may be used. As the group information according to the embodiment, i.e., various pieces of information on the peripheral devices in every group that the WDC 102 sets in advance are used by themselves as the group information or new information may be allocated to the group G2.

Sixth step: when the group information is acquired from the WDC 102 through the five steps, the dockee 100 requests the WDC 102 to release the connection of the group G1 so as to release the connection with the group G1 in Group 1 DIS-CONNECT.

Seventh step: in DIS-CONNECT, the WDC 102 transfers a request for releasing the connection to the peripheral devices included in the group G1 in order to support the direct connection of the dockee 100.

Eighth step: when the connection of the dockee 100 with the group G1 is released through sixth and seventh steps, the dockee 100 operates as the GO with respect to the group G2. Particularly, the dockee 100 may create a new Wi-Fi direct P2P group, i.e., a group G2, mapped on a channel supporting a specific service, by using group information of the peripheral devices that is acquired from the WDC 102 through the fifth step. Here, it is assumed that the group G2 includes the device P2 104*b*.

Ninth step: in Assisted Direct Connection (for Miracast), the dockee 100 may set a direct connection with the device P2 104 by using an IP address and a MAC address of the device P2 104*b* and the transient keys among group information acquired from the WDC 102. Particularly, if the device P2 104*b* discovers the group G2 according to the embodiment of the present disclosure, a request for joining in the group G2 may be transferred to the dockee 100 operating as the GO of the group G2 so as to set a direct connection with the dockee 100. Alternatively, when the dockee 100 invites the device P2 104*b* to join in the group G2 and receives acceptance of the device P2 104*b* with relation to the invitation, the direct connection may be set. In this event, according to the embodiment, the device P2 104*b* may acquire transient keys for the group G2 from the dockee 100 in a process of joining in the group G2. According to another embodiment, the device P2 104*b* may acquire the transient keys, which the dockee 100 use in the group G1 previously acquired by the WDC 102 through the fifth step, through the dockee 100 and use the transient keys in communication in the group G2.

Tenth step: in Miracast Connection, a direct connection between the dockee 100 and the device P2 104*b* is set. As an example, the direct connection may be a Miracast connection established between a Miracast source of the dockee 100 and a Miracast sink of the device P2 104*b*.

Eleventh step: in Group 2 INVITE, the dockee 100, operating as the GO of the group G2, transfers a request for joining in the GC of the group G2 to the WDC 102. Accordingly, the WDC 102 is connected as the GC of the group G2 to the dockee 100.

Twelfth step: in WDC dual mode, the WDC 102 operates in a dual mode. That is, the WDC 102 operates as the GO with respect to the group G1, while operating as the GC with respect to the group G2.

Hereinafter, it is assumed that communication through the direct connection between the dockee 100 and the device P2 104*b* is completed.

Thirteenth step: in Assisted Setup torn down, the dockee 100 requests the device P2 104*b* to release the direct connection.

Fourteenth step: in Group 2 DIS-CONNECT, the dockee 100 transfers the request for releasing the connection of the group G2 to the WDC 102. The GC related to the group G2 of the dockee 100, i.e., the connection between the WDC 102 and the device P2 104*b*, is released through thirteen and fourteen steps.

Fifteenth step: in Persistent INVITE, the WDC 102 according to the embodiment of the present disclosure operates as the GO with respect to the group G1. Accordingly, the WDC 102 may transfer the request for joining in the group G1 to the device P2 104*b*. If it is impossible that the device P2 104*b* resets the connection with the group G1, a process of setting the authorization and the group discovery previously performed along with the group G1 may be initialized. According to another embodiment, the device P2 104*b* may determine and transfer the request for joining in the group G1.

Sixteenth step: the dockee 100, disconnected from the group G2, may transfer a request for joining in the group G1 to the WDC 102 in Group 1 JOIN Request (Persisted Group Info used) in order to operate as the GC of the group G1. When the request for joining in the group G1 is received, the transient keys of the group G1 previously required through the authorization-setting step may be used in communication with respect to the group G1.

Figure 2:
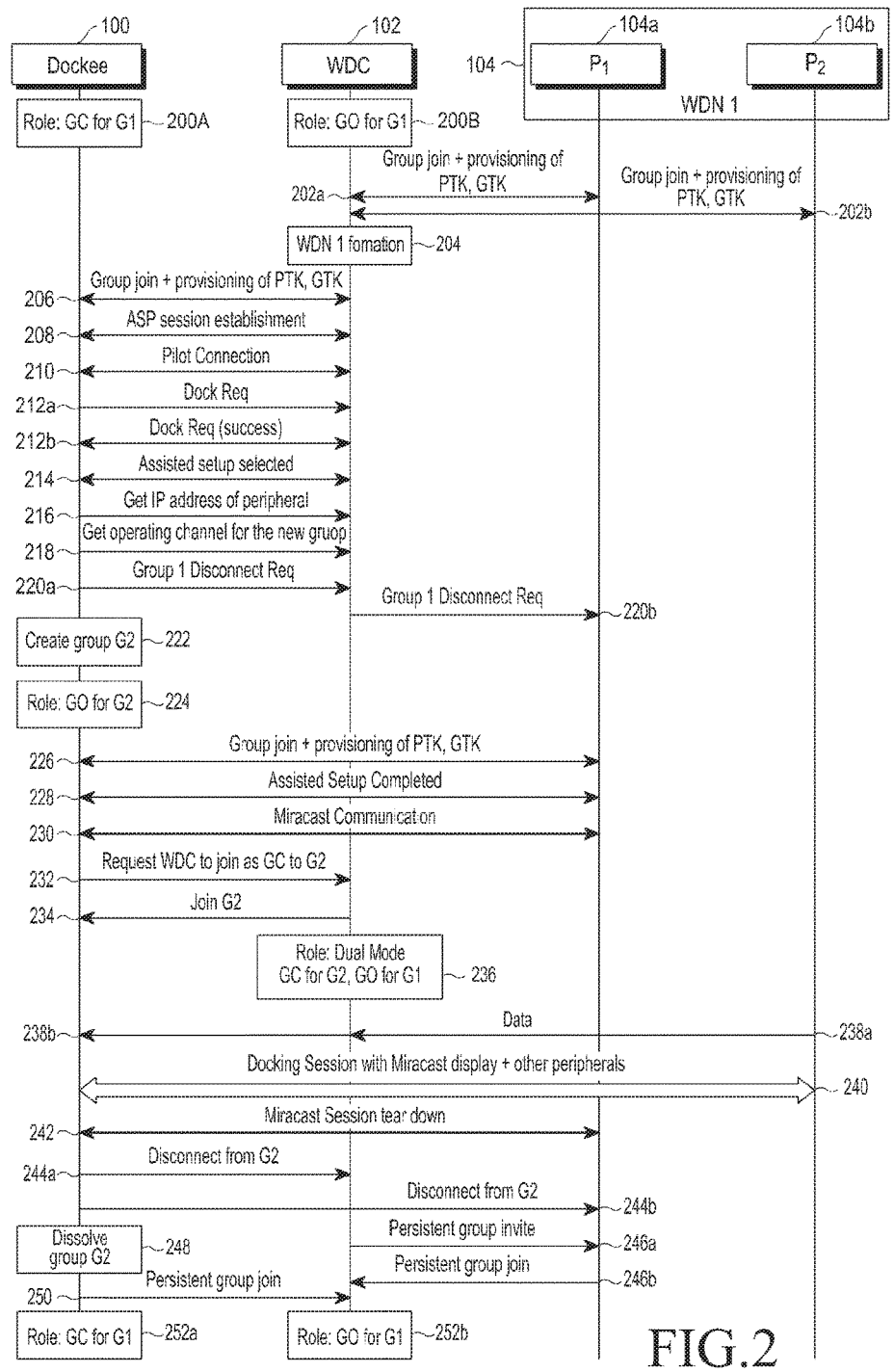
FIG. 2 is a data flow diagram of an operation of the dockee and a wireless docking center, which share group information for directly connecting the dockee with a peripheral device, according to the embodiment of the present disclosure.

FIG. 2 is a data flow diagram illustrating an operation of sharing group information for directly connecting the dockee 100 with a peripheral device by the dockee 100 and a wireless docking center (WDC) 102 according to the embodiment of the present disclosure. For convenience of the description, a wireless docking environment of FIG. 2 as an example will be described based on a case of FIG. 1. In the embodiment of of the present disclosure shown in FIG. 2, a pilot connection between the dockee 100 and the WDC 102 is set, and docking messages are exchanged through the pilot connection. Hereinafter, messages transmitted and received for the direct connection according to the embodiment of the present disclosure are defined as the docking messages in the description.

Referring to FIG. 2, it is assumed that the dockee 100 completes a group discovery, a join, and authorization procedures with respect to the group G1, in which the WDC 102 operates as the GO, and operates as the GC, in step 200A. Then, in step 200B, the WDC 102 operates as the GO with respect to the group G1.

In steps 202*a* and 202*b*, the WDC 102 performs a process of joining in the group G1 along with the devices P1 104*a* and P2 104*b* and the authorization for protecting the communication in the group G1, as an example of constituting the group G1. Therefore, the devices P1 104*a* and P2 104*b* receive allocated transient keys for the group G1 from the WDC 102 and have the authorization for the group G1. In step 204, the WDC 102 stores an IP address, a MAC address, and the transient keys with relation to each of the devices P1 104*a* and P2 104*b* constituting the group G1, as the group information of the group G1, i.e., information on WDN 1. Hereinafter, a case of storing the information on the WDN 1 104 with respect to the group G1 will be described as an example, for 25 convenience of the description. According to another embodiment, the WDC 102 may set at least one group with respect to a plurality of WDNs 104, and it may store an IP address, a MAC address, and the transient keys for each of peripheral devices constituting a corresponding group as the WDN information.

On the other hand, it is assumed that the dockee 100 discovers the group G1, which provides a specific service that the dockee intends to use. In this case, in step 206, the dockee 100 performs a process of joining in the group G1 along with the WDC 102 and setting the authorization so as to acquire the transient keys. Then, in step 208, the dockee 100 and the WDC 102 set an application service platform (ASP) for setting a connection and a docking session. In step 210, the dockee 100 sets a Pilot Connection for transmitting and receiving docking messages to/from the WDC 102. Then, in step 212a, the dockee 100 transfers a request for docking to the WDC 102 in order to be wirelessly connected with one of the devices included in the group G1, and in step 212b, the dockee 100 receives a notification of a completion in setting of the docking from the WDC 102.

When the completion in setting of the docking is received, the dockee 100 requests the WDC 102 to set a support in the direct connection in step 214. Next, in step 216, the dockee 100 according to the embodiment of the present disclosure transfers a request for an IP address of a peripheral device to which the dockee 100 intends to be directly connected, to the WDC 102. The WDC 102 selects one among the peripheral devices included in the group G1, which is able to be directly connected to the dockee 100, from the WDN 1 104 information. As an example, it is assumed that the device P1 104a is selected.

Then, in step 218, the dockee 100 requests the WDC 102 to provide information on an operating channel for a new group G2 constituted of peripheral devices to perform a direct connection. The WDC 102 determines a new operating channel in which a minimal interface used for the group G2 is present, and it transfers the information on the operating channel to the dockee 100.

Next, in steps 220a and 220b, the dockee 100 transfers a connection release request through the WDC 102 to the device P1 104a which performs a direct connection with the dockee 100.

In step 222, the dockee 100 creates the group G2 based on the operating channel information and the IP address acquired through steps 216, 217 and 218. Then, in step 224, the dockee 100 operates as the GO with respect to the group G2.

In step 226, the dockee 100 may wait for the request for joining of a peripheral device included in the group G2 in the group through the determined operating channel, or it may directly transfer the request for joining in the group to the peripheral device. As a particular example, it is assumed that the dockee 100 performs the process of joining in the group along with the device P1 104a of the group G2 and the process of setting the authorization. In this case, in setting the authorization of the group G2, the device P1 104a as the GC of the group G1 may use the allocated transient keys as they are.

When the setting of supporting the direct connection between the dockee 100 and the device P1 104a is complete in step 228, the dockee 100 performs data communication through the direct connection with the device P1 104a in step 230. In step 232, the dockee 100 transfers a request for joining as the GC of the group G2 in the group to the WDC 102 and, in step 234, receives a response to the request for joining in the group from the WDC 102. Accordingly, in step 236, the WDC 102 operates in the dual mode. That is, the WDC 102 operates as the GO with respect to the group G1 and as the GC with respect to the group G2.

In this event, as an example, in step 238a, when data is transmitted through the device P2 104b included in the group G1, the WDC 102 operates as the GO of the group G1 and transfers the data to the dockee 100 in step 238b. As a result, in step 240, the dockee maintains a state of docking with the device P2 104b included in the group G1 through the WDC 102 and is directly connected to the device P1 104a.

Then, when the data communication with the device P1 104a through the direct connection is complete, the dockee releases a session for the direct connection with the WDC 102 in step 242. In steps 244a and 244b, the dockee 100 transfers the connection release request of the group G2 to each of the WDC 102 and the device P1 104b, which are structural elements of the group G2, and completes an operation of releasing the connection with the group G2.

Continuously, the WDC 102 transfers a request for joining in the group G1 to the device P1 104a of which the direct connection is released, and it receives acceptance for the request for joining in the group G1 through step 246b.

Similarly, the dockee 100, which is disconnected from the group G2 in step 248, may perform a process of joining in the group G1 along with the WDC 102 in step 250. Thus, in step 252a, the dockee 100 operates as the GC of the group G1, and in step 252b, the WDC 102 operates as the GO of the group G1.

Figure 3A:
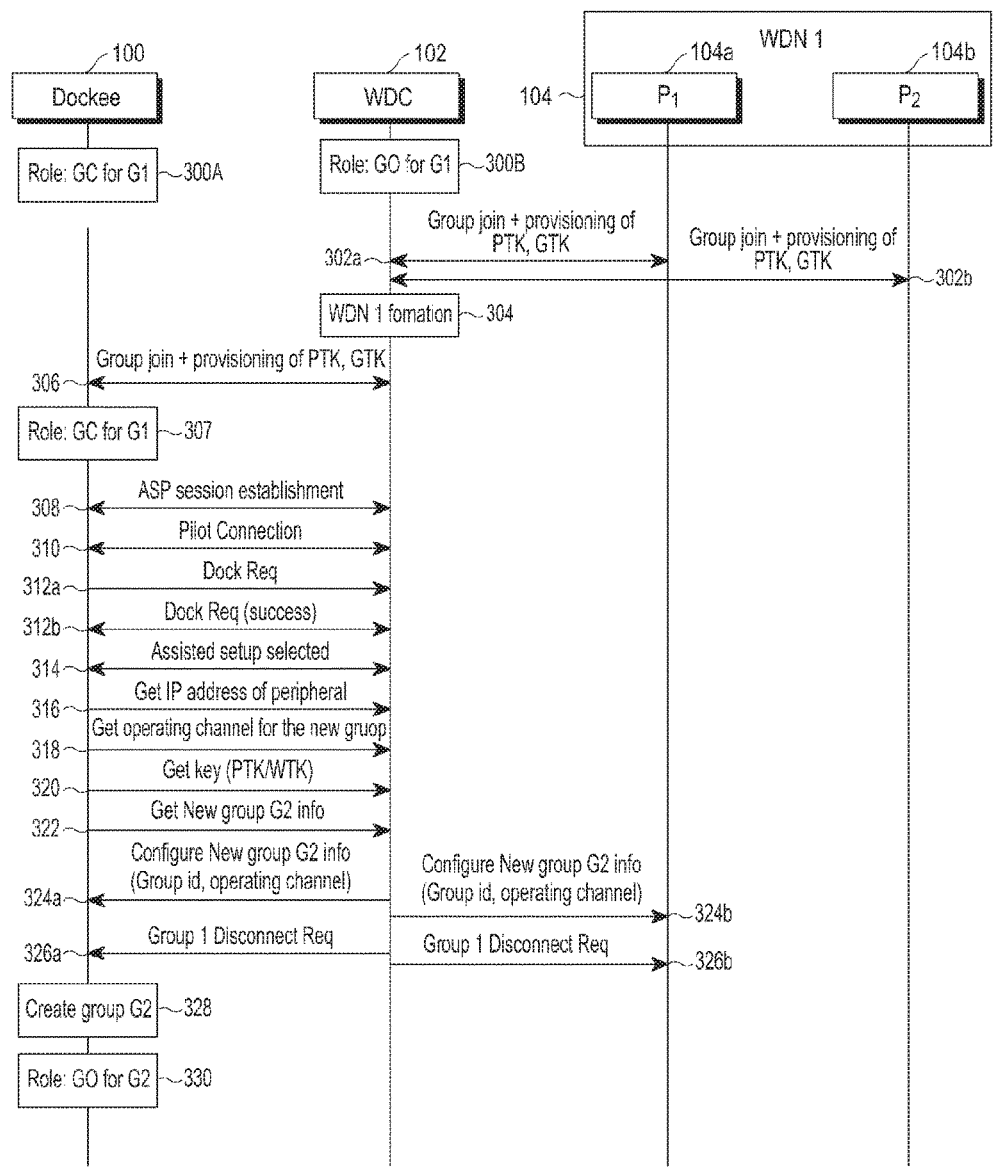
FIGS. 3A and 3B are data flow diagrams illustrating an operation of the dockee and a wireless docking center, which share group information for directly connecting the dockee with a peripheral device, according to the embodiment of the present disclosure.
Figure 3B:
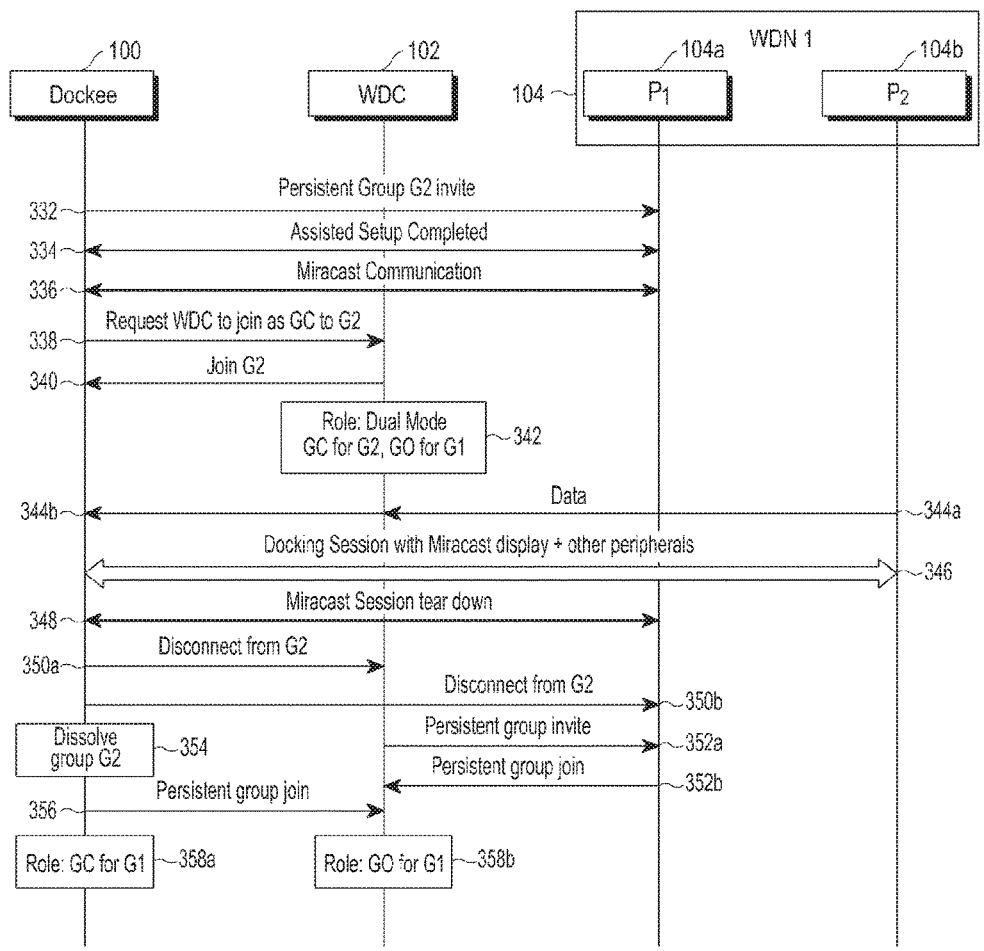

FIGS. 3A and 3B are data flow diagrams illustrating the dockee and the WDC 102, which share the group information for the direct connection between the dockee 100 and the peripheral device according to the embodiment of the present disclosure. Similarly, the wireless docking environment of FIGS. 3A and 3B is also based on a case of FIG. 1.

Referring to FIGS. 3A and 3B, it is assumed that the dockee 100 completes a group discovery, a join, and authorization procedures with respect to the group G1 in which the WDC 102 operates as the GO, while operating as the GC of the group G1, and the WDC 102 operates as the GO of the group G1. Steps 302a to 318 are identical to steps 202a to 218 of FIG. 2, and thus the duplicate description of the steps 302a to 318 will be omitted. When the dockee 100 completes the process of joining in the group G1 in step 306, the dockee 100 operates as the GC of the group G1 in step 307.

In the embodiment of the present disclosure shown in FIGS. 3A and 3B, the dockee 100 requests and acquires the transient keys, which the WDC 102 manages, through step 320. Herein, the transient keys include the PTK, the WTK, and the like as described above. Further, since the WDC 102 manages a plurality of groups for the peripheral devices, the transient keys are managed according to each group. Thus, the transient keys of the group, in which the peripheral device to perform the direct connection of the dockee 100 is included, are mapped on an identifier of the group and transferred.

In step 322, the dockee 100 transfers instructions, which enable the peripheral device performing the direct connection to configure group information for creating a new group G2, to the WDC 102. Accordingly, the WDC 102 selects the peripheral devices, which are able to be directly connected to the dockee 100, from each of the peripheral devices managed thereby, and it creates an IP address, a MAC address, group identifier and an operating channel of the group G2, and the like, as configuration information of the group G2. Further, the WDC 102 transfers the IP address, the MAC address, the group identification, the opening channel of the group G2, and the like, to the dockee 100 and the peripheral device included in the group G2, for example, the device P1 104a. The dockee 100 according to the embodiment of the present disclosure shown in FIGS. 3A and 3B acquires configuration information of the group G2 and the transient keys of the group G2 through steps 320 to 324b.

The dockee 100, which receives the configuration information of the group G2, transfers a request for a connection with the group G1 to the WDC 102 in step 326a. The WDC 102, which receives the request, recognizes that the dockee 100 is able to perform a direct connection with the group G2. Further, if the device P1 104a is present as an example of the GC included in the group G2 among the GCs of the group G1, the WDC 102 transfers a request for releasing the connection with the group G1 to the device P1 104a. In the case that not the GC of the group G2, but the GCs among the GCs of the group G1 are present, since the WDC 102 still operates as the GO of the group G1, it maintains a reference group joining state.

Further, in step 328, the dockee 100 creates the group G2 based on the acquired configuration information of the group G2, and operates as the GO of the G2 in step 330. Although the dockee 100 transfers a request for joining in the group G2 to the device P1 104a in step 332, discovery and authorization processes performed in a general group joining procedure are omitted because the configuration information of the group G2 and the transient keys are acquired through steps 320 to 324b. Then, since operations of setting, releasing, and recovering a direct connection to the group G1 through steps 334 to 358b are identically performed in steps 228 to 252b of FIG. 2, the duplicate description of the operations will be omitted.

On the other hand, WSB peripheral devices connected to the WDC 102 according to the embodiment of the present disclosure may be present. A WSB hub may be implemented in the WDC 102 in order to support the WSB peripheral devices. Further, a direct connection between the dockee 100 and the peripheral devices according to the embodiment of the present disclosure shown in FIGS. 2, 3A, and 3B may be performed through the WSB peripheral devices.

On the other hand, according to the embodiment of the present disclosure, the peripheral device in which a direct connection with the dockee 100 is set receives a request for releasing a connection with a corresponding group, in which the WDC 102 operates the GO, as the WDC 102. Then, while the setting of the direct connection between the dockee 100 and a corresponding peripheral device in which the connection with the WDC 102 is released is performed, an access control scheme of preventing the connection of the peripheral device to another dockee is required. The access control scheme according to the embodiment of the present disclosure uses a message in which an ASP user is defined.

Figure 4A:
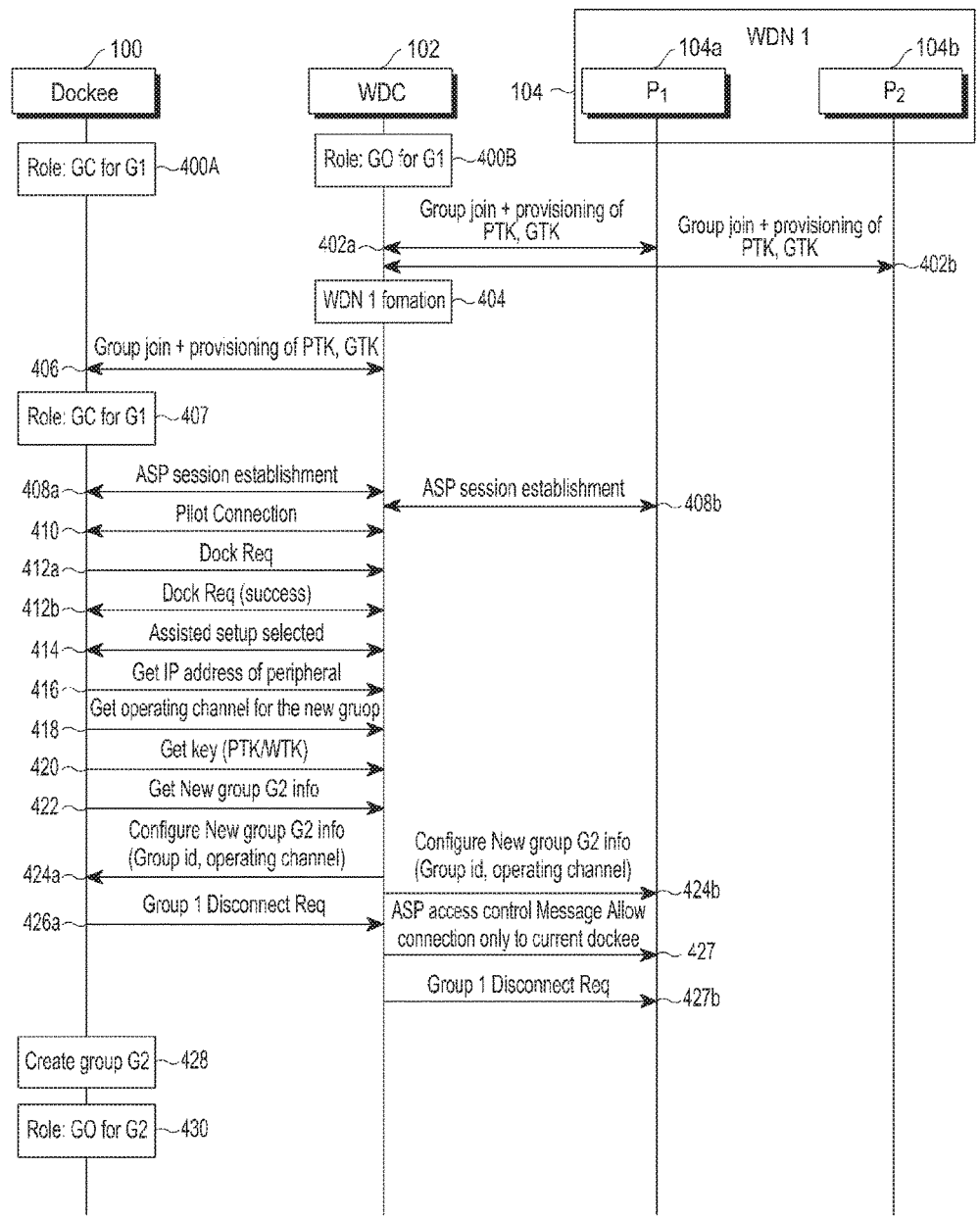
FIGS. 4A and 4B are data flow diagrams illustrating an access control scheme of preventing another dockee from being connected to the peripheral device directly connected to the dockee according to the embodiment of the present disclosure.
Figure 4B:
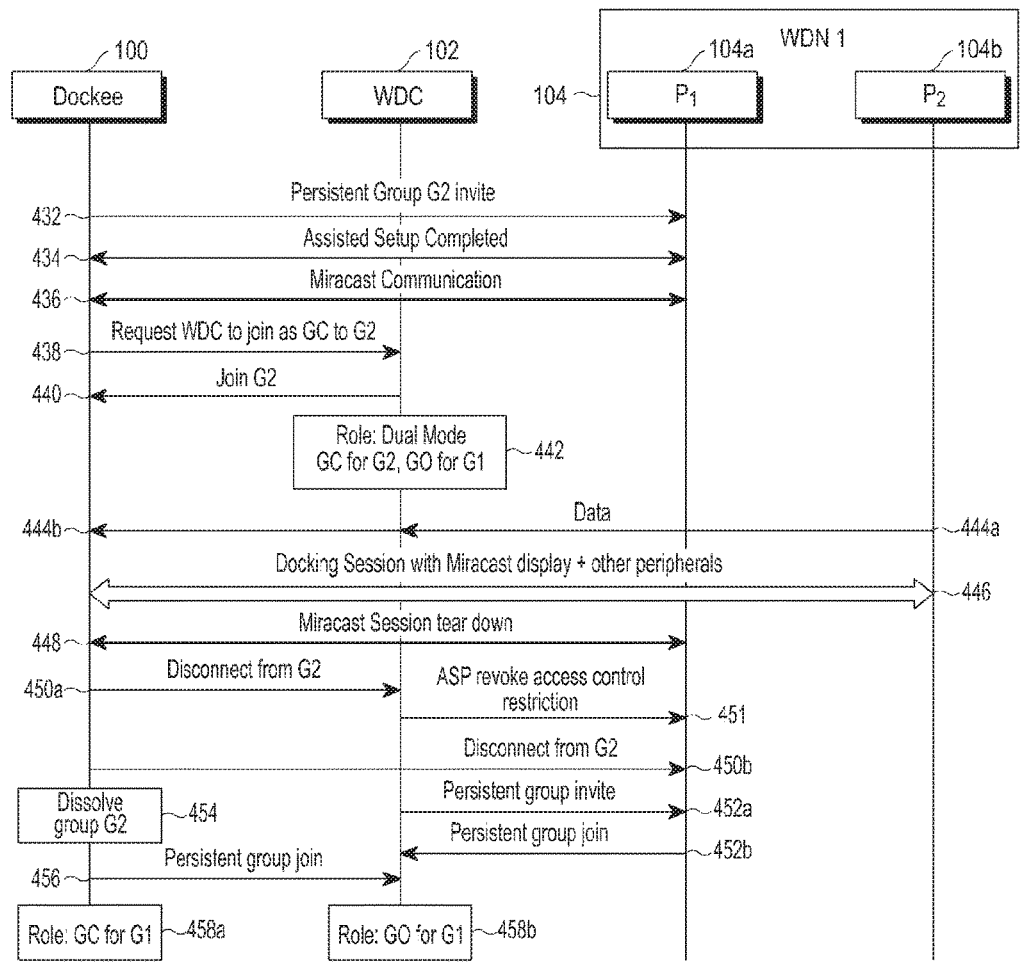

FIGS. 4A and 4B are data flow diagrams illustrating an access control scheme of preventing another dockee from being connected to the peripheral device directly connected to the dockee 100 according to the embodiment of the present disclosure. Similarly, the wireless docking environment of FIGS. 3A and 3B is also based on a case of FIG. 1.

Referring to FIGS. 4A and 4B, steps 400a to 407 are similar to steps 300 to 307 of FIGS. 3A and 3B, and thus the duplicate description of steps will be omitted.

In the embodiment of the present disclosure shown in FIGS. 4A and 4B, an ASP session between the WDC 102 and the peripheral devices, as well as between the dockee 100 and the WDC 102, is set through steps 408a and 408b. Further, steps 410 to 426a are performed identically to steps 310 to 326a.

On the other hand, according to the embodiment of the present disclosure shown in FIGS. 4A and 4B, in step 427 before a request for releasing a connection with the group G1 is transferred in step 426b, the WDC 102 transfers an access control message, in which an ASP user is defined and which instructs a restriction in access to only the dockee 100, to the device P1 104a through the ASP session. The device P1 104a is directly connected to the dockee 100 via a specific MAC address through the access control message in which the ASP user is defined, and it is prevented from being connected to other dockees. Then, steps 426b to 450a also are performed identically to steps 326b to 350a of FIGS. 3A and 3B. Further, in step 451 before the step 450b in which a request for releasing a direct connection with the group G2 is transferred to the device P1 104a, the WDC 102 transfers the ASP access control message, which instructs a revoke of the restriction in the access to the dockee 100, to the device P1 104a. According to another embodiment of the present disclosure, the restriction in the access to the dockee 100 may be set to be automatically revoked when the direct connection with the dockee 100 is released.

Steps 450b to 458b are performed identically to steps 350b to 358b of FIGS. 3A and 3B, and thus the duplicate description of the steps will be described.

Figure 5:
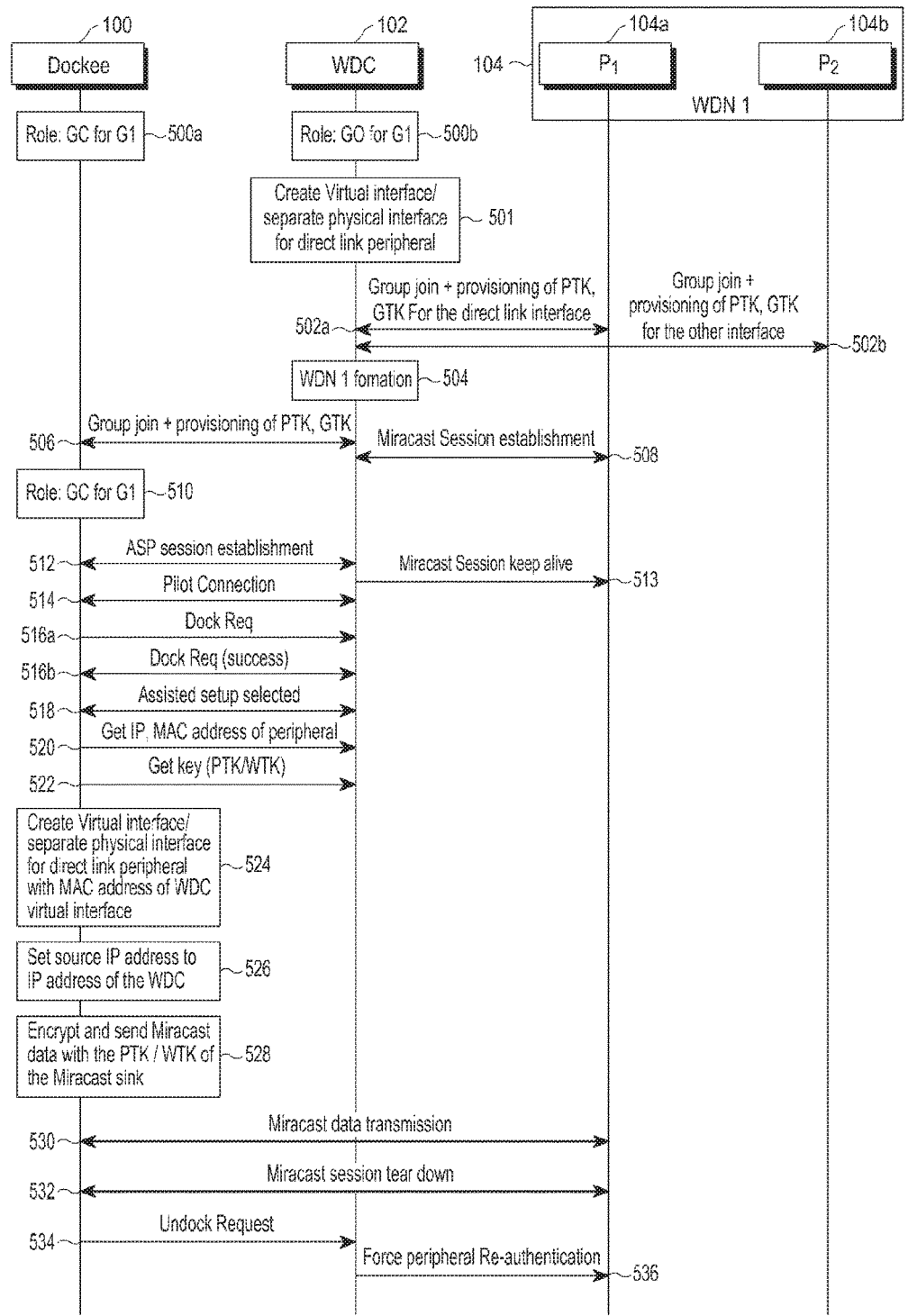
FIG. 5 is a data flow diagram illustrating an operation of a wireless docking center, which creates an exclusive interface to a peripheral device directly connected to the dockee so as to support a direct connection, according to the embodiment of the present disclosure.

FIG. 5 is a data flow diagram illustrating an operation of a wireless docking center which creates an exclusive interface to a peripheral device directly connected to the dockee 100 so as to support a direct connection according to the embodiment of the present disclosure. For convenience of the description, a wireless docking environment of FIG. 2 will be described, for example, based on a case of FIG. 1.

Referring to FIG. 5, it is assumed that the dockee 100 completes a group discovery, a join, and authorization procedures with respect to the group G1 in which the WDC 102 operates as the GO while operating as the GC of the group G1 in step 500a, and the WDC 102 operates as the GO of the group G1 in step 500b.

In the embodiment of the present disclosure shown in FIG. 5, it is assumed that the WDC 102 supports a setting of a direct connection between the dockee 100 and the peripheral device having a Miracast sink. Thus, in step 501, the WDC 102 creates an exclusive interface used to set the direct connection of each peripheral device. The exclusive interface may be either a separate physical interface having the MAC address of a corresponding peripheral device, or a virtual interface having a specified virtual MAC address in order to support the direct connection of the peripheral device.

In step 502a, the WDC 102 performs a process of joining in the group G1 with respect to the peripheral device, for example, the device P1 104a, in which the direct connection is set, based on the MAC address of the exclusive interface. In the joining process, the device P1 104a is connected to the WDC 102 through the exclusive interface, and the transient keys in which the authorization for the group G2 is set are transferred to the device P1 104a and the device P2 104b. Then, in step 502b, the WDC 102 performs a process of joining in the group G1 with respect to the peripheral device, for example, the device P2 104b in which the direct connection is not set, based on the MAC address of other interfaces. In step 504, the WDC 102 stores the IP address, the MAC address, and the transient keys with relation to each of the devices P1 and P2 104a and 104b, as the group information of the group G1, i.e., information on WDN 1.

On the other hand, it is assumed that the dockee 100 discovers the group G1 which provides a specific service which the dockee intends to use. In this case, in step 506, the dockee 100 performs a process of joining in the group G1 along with the WDC 102 and setting the authorization so as to acquire information on the transient keys of the group G1.

In step 508, the WDC 102 performs all processes of setting the Miracast session along with the device P1 104a, which is directly connected to the dockee 100.

Then, the dockee 100 is docked with the WDC 102 by setting an ASP session and a pilot connection with the WDC 102 through steps 512 to 518. The steps 512 to 518 are performed identically to steps 208 to 214 in FIG. 2. In steps 520 to 522 of FIG. 5, the dockee 100 requests the WDC 102 of information necessary for setting the direct connection with the peripheral device and acquires the information from the WDC 102. In another embodiment, the WDC 102 may provide information necessary for connecting the direct connection to the dockee 100 even though the dockee 100 does not request such. The information includes the above-described transient keys. In the embodiment of the present disclosure shown in FIG. 5, the information includes the IP address and/or the MAC address of the exclusive interface of the device P1 104a, which the WDC 102 creates for the direct connection.

On the other hand, the dockee 100 acquires the IP address and/or the MAC address of the exclusive interface of the device P1 104a through steps 520 to 522. Then, in step 524, the dockee 100 creates a physical interface based on information related to the setting of the direct connection, for example, the MAC address of the exclusive interface of the device P1 104a. Next, in step 526, the dockee 100 sets the IP address or the MAC address of the WDC 10 as a source address. In step 528, the dockee 100 encrypts data to be transferred to the Miracast sink, which is directly connection with the device P1 104a, by using the acquired transient keys. Then, the dockee 100 transfers the encrypted data to the device P1 104a, to which the dockee 100 is directly connected, through step 530. The dockee 100 may frequently transfer information on an empty screen within a predetermined timeout in order to continuously maintain the direct connection.

When the direct connection between the dockee 100 and the device P1 104a is released in step 532, the dockee 100 requests the WDC 102 to release the docking in step 534 and invalidates the transient keys allocated for the direct connection in step 522. Then, in step 536, the WDC 102 requires the peripheral devices for re-authentication, and thus a new transient key may be allocated to the peripheral devices.

Figure 6:
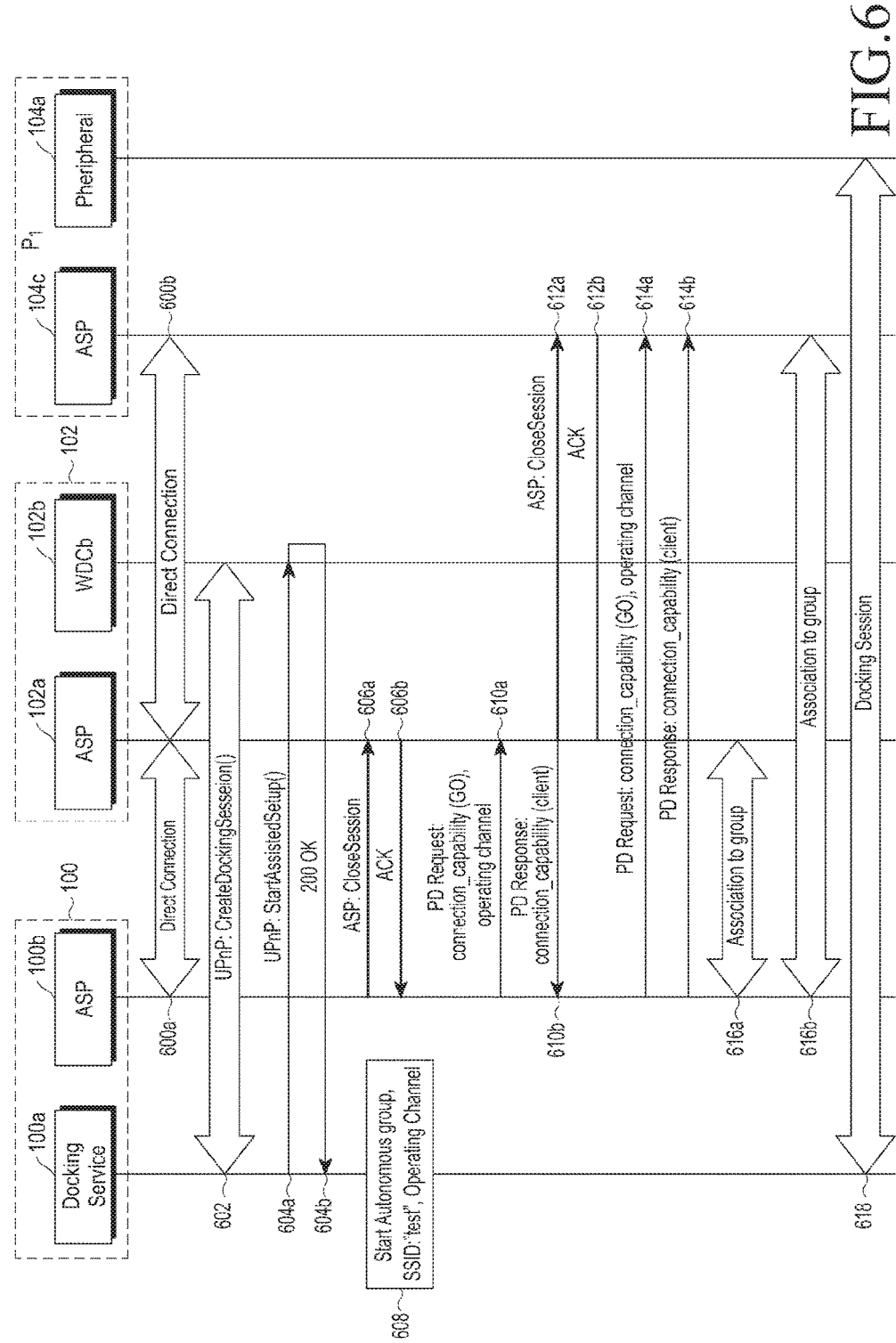
FIG. 6 is a data flow diagram illustrating an operation of setting a direct connection based on an ASP using a provision discovery (PD) according to the embodiment of the present disclosure.

FIG. 6 is a data flow diagram illustrating an operation of setting a direct connection based on an ASP using a provision discovery (PD) according to the embodiment of the present disclosure. In the embodiment of the present disclosure shown in FIG. 6, the dockee 100, the WDC 102, and the device P1 104a are configured in the form of including the ASP.

Although it is not shown in FIG. 6, in the case that the dockee 100 discovers a specific service that the WDC 102 provides, the dockee 100 is docked with the WDC 102 through the above-described processes. When a docking session with the WDC 102 is set, the dockee 100 identifies the peripheral device, to which the dockee 100 is directly connected among the peripheral devices associated with the WDC 102. It is assumed that as the result of identification, the dockee 100 discovers the device P1 104a. Then, in steps 600a and 600b, the ASP 100b of the dockee 100 sets a direct connection with an ASP 104c of the device P1 104a through an ASP 102a of the WDC 102. According to another embodiment, the WDC 102 may instruct the dockee 100 to set the direct connection.

In step 602, a docking service unit 100a of the dockee 100 and the WDCb 102b set the docking session by using a UPnP. In the process of setting the docking session, the WDCb 102b may transfer discovery information so that the dockee 100 selects the peripheral device or the WDC 102 providing a corresponding service. The discovery information may include an ASP advertisement ID of an ASP service provided by the peripheral device, an ASP service name of the ASP service provided by the peripheral device, service information of the ASP service provided by the peripheral device, information on a role performed with respect to a corresponding WDN, i.e., information on GO or GC, a MAC address of peripheral devices, information on a support setting mode which instructs the peripheral device to automatically accept and support the ASP, information on a public key acquired from the peripheral device, and the like. The dockee 100 receiving the discovery information enables a docking service unit 100a to transfer instruction, in which a setting of supporting the direction connection is initiated, to the WDCb 102b in order to initiate the process of supporting the direct connection. As a particular embodiment, the dockee 100 may transmit a universal plug and play (UPnP) action message, in which an action name is set to "AssistedSetupStart", to the WDC 102. Thus, it is possible to initialize the setting of supporting the direct connection. In this event, the UPnP action message may further include a 'DockingSeessionId' for identifying a docking session, a 'PfId' for identifying the peripheral device, an 'ActionType' set to "assistedSetupStart", an 'assistedSetupMode' set to a mode selected by the dockee, and the like.

Then, when receiving acknowledgment for the reception of the instruction from the WDCb 102b in step 604b, the docking service unit 100a performs step 606. Particularly, when the WDC 102 accepts the setting of supporting the direct connection through the acknowledgment for the reception of the instruction, the WDC 102 may transmit an UPnP action response, which has an actionNameResponse set to "assistedSetup", to the dockee 100.

In step 606a, the ASP 100b of the dockee 100 transfers a request for a close of the ASP session to the ASP 102a of the WDC 102 if the ASP 100b is not the GO for a P2P connection with the WDC 102. Then, in step 606b, the ASP 100b receives a response to the close of the ASP session from the ASP 102a of the WDC 102. At this time, the docking of the dockee 100 with the WDC 102 is maintained. Accordingly, in step 608, the docking service unit 100a creates a new group for a direct connection. Then, in step 610a, the ASP 100b of the dockee 100 transfers a request of provision discovery to the ASP 102a of the WDC 102 which has a reception amount of connections set to the GO of the new group. Here, the PD request means a request of joining in the new group as the GC to the WDC 102. The ASP 102a receiving the PD request transfers a PD response to the ASP 100b of the dockee 100 which has the reception amount of the connections set to the GC of the new group in step 610b. Then, the WDCb 102b joins as the GC in the new group. Accordingly, the dockee 100 may initialize a new ASP session for the docking service, and utilize other peripheral devices through the WDCb 102b.

In steps 612a and 612b, when the ASP 102a of the WDC 102 transfers the request of the close of the ASP session to the ASP 104c of the device P1 104a, and then receives a response to the close of the ASP session, the ASP 102a of the WDC 102 joins as the GC in the group of the dockee 100.

The ASP 100b of the dockee 100, which receives the PD response from the ASP 102a of the WDC 102, directly transfers the PD request to the peripheral device, e.g., the device P1 104a, which has the reception amount of the connections set to the operating channel and the GO of the new group, in step 614a, and it receives a response to the PD request from the ASP 104c of the device P1 104a in step 614b. Accordingly, the device P1 104 also operates as the GC in the new group of the dockee 100. In steps 616a and 616b, with relation to the group of the dockee 100 which operates as the GO, the WDC 102 and the device P1 104a are associated with each other and operate as the GC. As a result, a direct connection, i.e., a docking session, between the dockee 100 and the device P1 104a is set.

Figure 7:
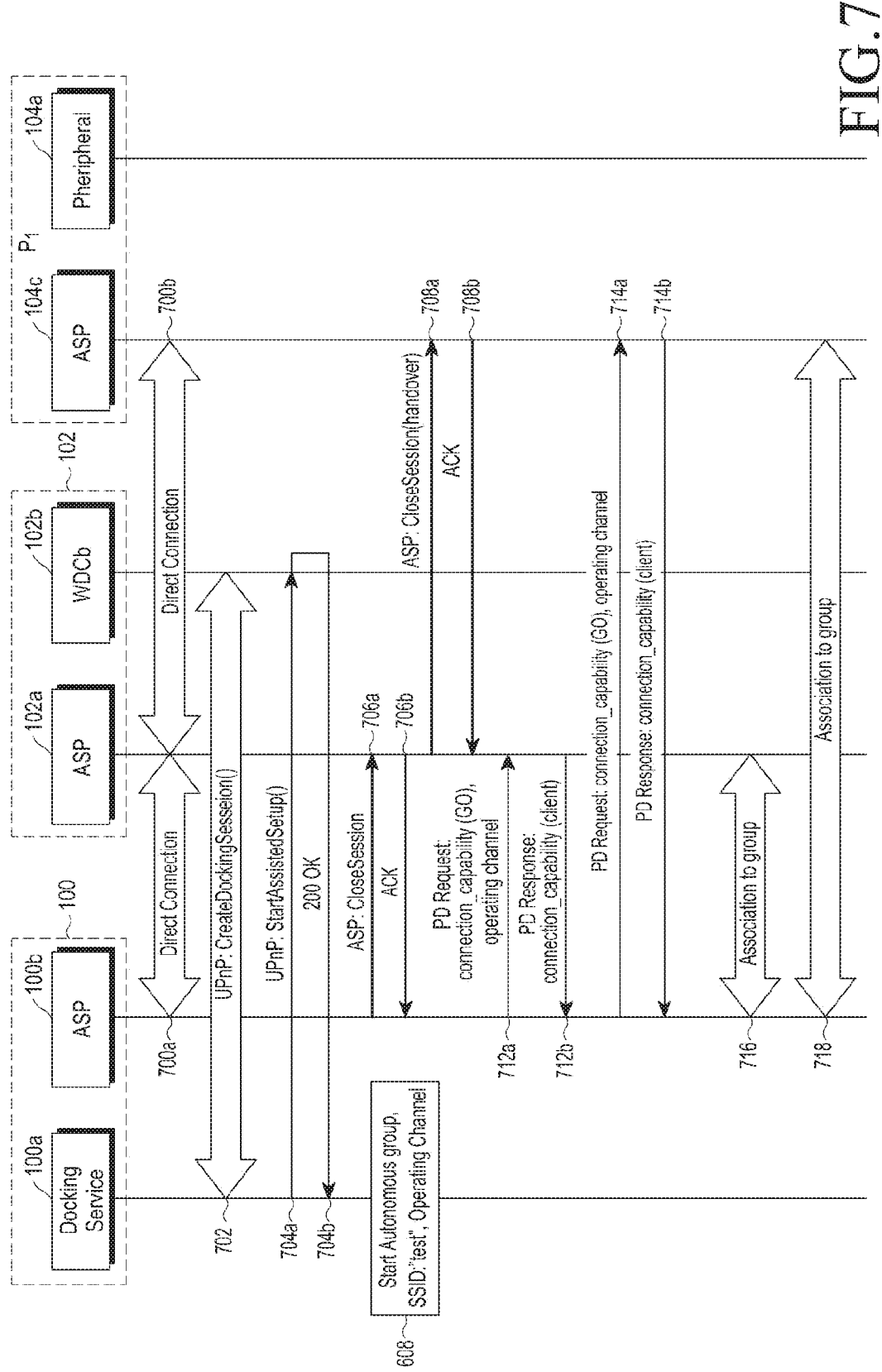
FIG. 7 is a data flow diagram illustrating an operation of setting a direct connection based on an ASP using a handover procedure according to the embodiment of the present disclosure.

FIG. 7 is a data flow diagram illustrating an operation of setting the direct connection based on an ASP using a handover procedure according to the embodiment of the present disclosure. In the embodiment of the present disclosure shown in FIG. 7, the dockee 100, the WDC 102, and the device P1 104a are configured in the form of including the ASP, similarly to the embodiment of the present disclosure shown in FIG. 6.

Referring to FIG. 7, steps 700a and 700b are performed identically to steps 600a and 600b, and thus the duplicate description of steps 700a and 700b will be omitted.

In step 702, the docking service unit 100a of the dockee 100 and the WDC 102b set the docking session by using a UPnP. Then, in step 704a, the docking service unit 100a transfers instruction of initiating the setting of supporting the direct connection to the WDCb 102b. Particularly, the dockee 100 may transmit an action message, in which an action name is set to "AssistedSetup", to the WDC 102. Thus, it is possible to initialize the setting of supporting the direct connection. Then, in step 704b, the docking service unit 100a may enable the WDC 102 to transfer a UPnP action response, which has an actionNameResponse set as "AssistedSetup", to the dockee 100 through the acknowledgment for the reception of the instruction.

In step 706a, the ASP 100b of the dockee 100 transfers a request for a close of the ASP session to the ASP 102a of the WDC 102 if the ASP 100b does not operate as the GO of the group which includes the peripheral device to be directly connected. Then, in step 706b, the ASP 100b receives a response to the close of the ASP session from the ASP 102a of the WDC 102. At this time, the docking of the dockee 100 with the WDC 102 is maintained. Accordingly, in step 708, the docking service unit 100a creates a new P2P group.

In step 708b, the ASP 102a of the WDC 102 transfers a request for the close of the ASP session to the peripheral device, e.g., the ASP 104c of the device P1 104a, which has handover parameters. Here, the handover parameters may include additional security credentials such as an MAC address of the dockee 100 and Wi-Fi protected setup (WPS) pin information. Further, the ASP 102a provides a name, information, and an operating channel of the new group constituted of the peripheral devices to be directly connected with the dockee 100 to the device P1 104a along with the request for the close of the ASP session. In the embodiment of FIG. 7, the handover means that the WDC 102 transfers a new group to the peripheral device, which is directly connected with the dockee 100, to the dockee 100. In step 710, the docking service unit 100a of the dockee 100, which receives the acknowledgement for the close of the ASP session from the WDC 102, starts the new group for the direct connection based on group information acquired from the WDC 102 in advance. Then, in step 712a, the ASP 100b of the dockee 100 transfers a request of provision discovery to the ASP 102a of the WDC 102, which has a reception amount of connections of the GO of the new group. Then, in step 712b, the ASP 100b of the dockee 100 receives a PD response from the ASP 102a of the WDC 102. Then, the WDCb 102b joins as the GC in the new group.

Similarly, in step 714a, the ASP 100b of the dockee 100 transfers a request of provision discovery to the ASP 104c of the device P1 104a, which has a reception amount of connections set to the GO of the new group. A service identifier, information on an operating channel, and the like, which are provided by the directly connected group, are transferred along with the PD request. Then, in step 714b, the ASP 100b of the dockee 100 receives a PD response from the ASP 104c of the device P1 104a.

Then, the dockee 100 and the device P1 104a has an ASP session to be set, and the WDC 102 and the device P1 104a operate as the GC of the group for the direct connection with the dockee 100.

Figure 8:
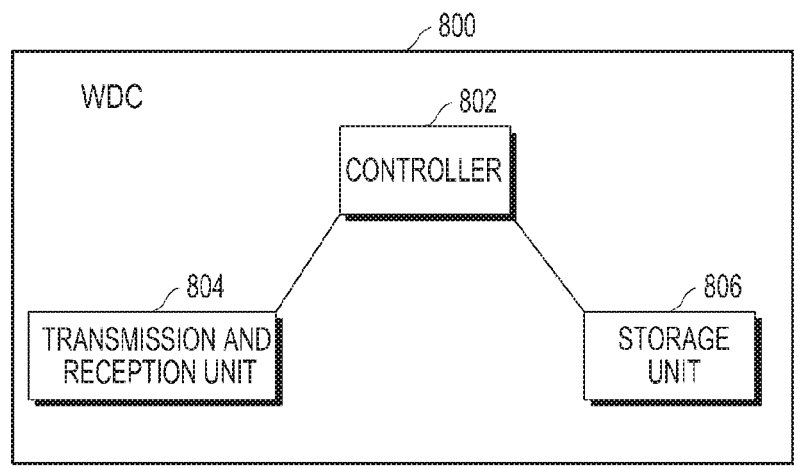
FIG. 8 illustrates a configuration of a wireless docking center supporting a direct connection between a dockee and a peripheral device according to the embodiment of the present disclosure.

FIG. 8 illustrates a configuration of a wireless docking center (WDC) 800 for supporting a direct connection between a dockee and a peripheral device according to the embodiment of the present disclosure. The WDC 800 configuration of FIG. 8 is merely configured depending on each operation according to the embodiment of the present disclosure for convenience of the description, and may be classified into several units for the corresponding operation according to the embodiment, or at least two WDCs may be integrated into one unit.

Referring to FIG. 8, the WDC 800 includes a controller 802, a transmission and reception unit 804, and a storage unit 806. The controller 800 is associated with the peripheral devices and groups the peripheral devices depending on each service so as to perform authorization for a corresponding group. Further, the controller 802 provides a docking service to the dockee 100, which joins in the group, while supporting the direct connection with at least one of the peripheral devices. The process of supporting the direct connection may be performed like in the above-mentioned embodiment of the present disclosure shown in FIGS. 2 to 7. The transmission and reception unit 804 transmits and receives messages for the direct connection according to the instruction of the controller 802, and the storage unit 806 stores group information of each group. The group information of each group is identical to the previously described information, and thus, the duplicate description of the group information will be omitted.

Figure 9:
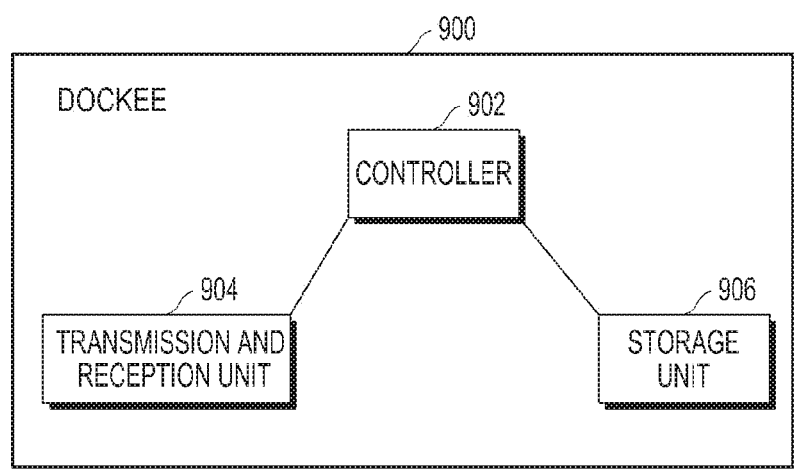
FIG. 9 illustrates a configuration of a dockee supporting a direct connection between a dockee and a peripheral device according to the embodiment of the present disclosure.

FIG. 9 illustrates the configuration of the dockee 900 supporting the direct connection between the dockee 900 and the peripheral device according to the embodiment of the present disclosure. Similarly, the configuration of the dockee 900 in FIG. 9 is merely configured depending on each operation according to the embodiment of the present disclosure for convenience of the description and may be classified into several units for the corresponding operation according to the embodiment, or at least two dockees may be integrated into one unit.

Referring to FIG. 9, the dockee 900 includes a controller 902, a transmission and reception unit 904, and a storage unit 906.

When the controller 902 of the dockee 900 discovers a group providing a service to be used, it performs processes of joining in and setting authorization for the group and the GO of the group. Then, the controller 902 transfers a request for supporting the setting of the direct connection with the peripheral device to the WDC 800 and performs the process of setting the direct connection. The processes of requesting and performing support for the setting of the direct connection may be identically performed according to the embodiment of the present disclosure shown in FIGS. 2 to 7. The transmission and reception unit 904 transmits and receives messages for the direct connection according to the instruction of the controller 902, and the storage unit 906 stores group information of each group. The group information of each group is identical to the previously described information, and thus, the duplicate description of the group information will be omitted.

The specific aspects of the present disclosure may be also implemented as computer readable codes in a computer readable recording medium. The computer readable recording medium is a specific data storage device for storing data read by a computer system. For example, the computer readable recording medium may include a Read-Only Memory (ROM), a Random-Access Memory (RAM), a CD-ROM, a magnetic tape, a floppy disk, an optical data storage device, and a carrier wave (a transmission of data through Internet). The computer readable recording medium may be distributed through computer systems connected to a network, and thus, the computer readable code may be stored and executed in a distributed manner. Further, functional programs, codes, and code segments for establishing the present disclosure may be easily interpreted by programmers skilled in the art to which the present disclosure is applied.

It may be appreciated that the method of controlling the camera apparatus according to the embodiments of the present disclosure can be implemented in software, hardware, or a combination thereof Any such software may be stored, for example, in a volatile or non-volatile storage device such as a ROM, a memory such as a RAM, a memory chip, a memory device, or a memory IC, a recordable optical or magnetic medium such as a CD, a DVD, a magnetic disk, or a magnetic tape, regardless of its ability to be erased or its ability to be re-recorded, and a machine readable storage medium, e.g., a computer readable storage medium. It can be also appreciated that the memory included in the mobile terminal is one example of machine-readable devices suitable for storing a program including instructions that are executed by a processor device to thereby implement embodiments of the present disclosure.

Accordingly, the present disclosure includes a program including a code for implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

A portable terminal according to the embodiments of the present disclosure may receive the program from a program providing device that is wiredly or wirelessly connected with the portable terminal, and may store the program. The program providing apparatus may include a program including instructions through which a graphic processing apparatus implements a preset content protecting method, a memory for storing information or the like required for the content protecting method, a communication unit for performing wired or wireless communication with the graphic processing apparatus, and a controller for transmitting the corresponding program to a transceiver according to a request of the graphic processing apparatus or automatically.

Although the embodiment of the present disclosure has been described in the detailed description of the present disclosure, the present disclosure may be modified in various forms without departing from the scope of the present disclosure. Thus, the scope of the present disclosure shall not be determined merely based on the described embodiments and rather determined based on the accompanying claims and the equivalents thereto.

What is claimed is:

1. A method of assisting communication between a dockee and a peripheral device by a docking center in a wireless docking network, the method comprising:
   transmitting, by the docking center which is a group owner of a first group, to the dockee, information for a direct connection between the dockee and the peripheral device, wherein the docking center is connected to the peripheral device;
   receiving, from the dockee, an assist request for setting the direct connection based on the information;
   transmitting, to the dockee, a response indicating whether the assist request is accepted;
   receiving, from the dockee, a release request for releasing a connection between the dockee and the docking center and the connection between the docking center and the peripheral device;
   terminating control of the peripheral device;
   receiving, from the dockee, a joining request for requesting to join a second group;
   transmitting, to the dockee, a response for joining the second group as a client, wherein the dockee is set as an owner in the second group; and
   operating as the group owner of the first group and the client of the second group.

2. The method of claim 1, wherein the information includes at least one of public keys obtained from the peripheral device, which is paired to the docking center, and a physical address of the peripheral device.

3. The method of claim 1, wherein the receiving the joining request comprises receiving, from the dockee, a provision discovery (PD) request for joining the second group.

4. The method of claim 1, wherein the transmitting the response for joining the second group as the client comprises transmitting, if the docking center joins the second group as the client, a PD response in response to the joining request to the dockee.

5. A method of setting, by a dockee, a direct connection between the dockee and a peripheral device in a wireless docking network, the method comprising:
   docking to a docking center which is a group owner of a first group;
   transmitting, if information for the direct connection between the dockee and the peripheral device is received, an assist request for setting the direct connection based on the information, to the docking center;
   receiving a response indicating whether the assist request is accepted from the docking center;
   transmitting, a release request for releasing a connection between the dockee and the docking center and a connection between the docking center and the peripheral device, to the docking center;
   receiving a response to the release request from the docking center;
   transmitting a joining request to the docking center for requesting to join a second group; and
   receiving a response from the docking center for joining the second group as a client, wherein the dockee is set as an owner in the second group.

6. The method of claim 5, wherein the information includes at least one of public keys obtained from the peripheral devices paired to the docking center, and a physical address of the peripheral device.

7. The method of claim 5, wherein transmitting the joining request comprises transmitting a provision discovery (PD) request for joining the second group, to the docking center.

8. The method of claim 5, wherein receiving the response for joining the second group as the client comprises receiving, if the docking center joins the second group as the client, a PD response in response to the joining request from the dockee.

9. The method of claim 5, further comprising:
transmitting, if terminating of the direct connection is determined, an assist stop request to the docking center; and
transmitting a release request of the direct connection to the peripheral device.

10. A docking center for assisting communication between a dockee and a peripheral device in a wireless docking network, the docking center comprising:
a transceiver configured to:
transmit, to the dockee, information for a direct connection between the dockee and the peripheral device, wherein the docking center is connected to the peripheral device and a group owner of a first group,
receive, from the dockee, an assist request for setting the direct connection based on the information,
transmit, to the dockee, a response indicating whether the assist request is accepted,
receive, from the dockee, a release request for releasing a connection between the dockee and the docking center and a connection between the docking center and the peripheral device,
receive, from the dockee, a joining request for requesting to join a second group, and
transmit, to the dockee, a response for joining the second group as a client, wherein the dockee is set as an owner in the second group; and
a controller configured to:
terminate control of the peripheral device, and
operate as the group owner of the first group and the client of the second group.

11. The docking center of claim 10, wherein the information includes at least one of public keys obtained from the peripheral device, which is paired to the docking center, and a physical address of the peripheral device.

12. The docking center of claim 10, wherein the transceiver is further configured to receive, from the dockee, a provision discovery (PD) request for joining the second group.

13. The docking center of claim 10, wherein the transceiver is further configured to transmit, if the docking center joins the second group as the client, a PD response in response to the joining request to the dockee.

14. A dockee for setting a direct connection between the dockee and a peripheral device in a wireless docking network, the dockee comprising:
a controller configured to dock to a docking center which is a group owner of a first group; and
a transceiver configured to:
transmit an assist request for setting a direct connection between the dockee and the peripheral device based on information for the direct connection, to the docking center, if the information for the direct connection is received,
receive a response indicating whether the assist request is accepted from the docking center,
transmit a release request for releasing a connection between the dockee and the docking center and a connection between the docking center and the peripheral device, to the docking center,
receive a response to the release request from the docking center,
transmit a joining request to the docking center for requesting to join a second group, and
receive a response from the docking center for joining the second group as a client, wherein the dockee is set as an owner in the second group.

15. The dockee of claim 14, wherein the information includes at least one of public keys obtained from the peripheral devices paired to the docking center, and a physical address of the peripheral device.

16. The dockee of claim 14, wherein the transceiver is further configured to transmit a provision discovery (PD) request for joining the second group, to the docking center.

17. The dockee of claim 14, wherein the transceiver is further configured to receive, if the docking center joins the second group as the client, a PD response in response to the joining request from the dockee.

18. The dockee of claim 14, wherein the controller is further configured to transmit an assist stop request to the docking center, if terminating of the direct connection is determined, and
wherein the transceiver is further configured to transmit a release request of the direct connection to the peripheral device.

* * * * *